United States Patent [19]

Parker

[11] Patent Number: 4,547,677
[45] Date of Patent: Oct. 15, 1985

[54] RADIATION DETECTING APPARATUS FOR DETECTING A BRIEF RADIATION SIGNAL

[75] Inventor: John C. Parker, Edinburgh, Scotland

[73] Assignee: Ferranti, plc, London, England

[21] Appl. No.: 505,280

[22] Filed: Jun. 17, 1983

[30] Foreign Application Priority Data

Jun. 24, 1982 [GB] United Kingdom ............... 8218551

[51] Int. Cl.[4] ..................... H01L 27/10; H04N 3/15
[52] U.S. Cl. ................................. 250/578; 357/24; 358/213
[58] Field of Search ............................. 250/578, 209; 357/24 LR, 30, 32; 358/209, 212, 213

[56] References Cited

U.S. PATENT DOCUMENTS 3,801,884  4/1974  Sequin ........................... 357/24 L
4,301,471  11/1981  Holscher et al. ............... 358/212
4,447,735  5/1984  Horii ............................. 250/578

*Primary Examiner*—Edward P. Westin

*Attorney, Agent, or Firm*—Kerkam, Stowell Kondracki and Clarke

[57] ABSTRACT

The apparatus includes a two-coordinate array of radiation sensitive devices each operable to cause the storage of a charge proportional to the intensity and duration of radiation received. A storage element is associated with each sensitive circuit and a transfer mechanism is operable to transfer the charge from each sensitive circuit to its storage element to define a radiation image frame. A register is arranged in the same two coordinate array, and a shift mechanism operates to transfer charge from the storage elements to the register in parallel bit streams defined by one of the two coordinates. Differential detectors compare corresponding bits shifted into and out of the register and the presence of a detector output exceeding a threshold level causes the detector outputs to be sampled into an output register. The contents of the output register are shifted out serially to determine the position in the radiation image frame of each output register bit position producing a detector output.

9 Claims, 1 Drawing Figure

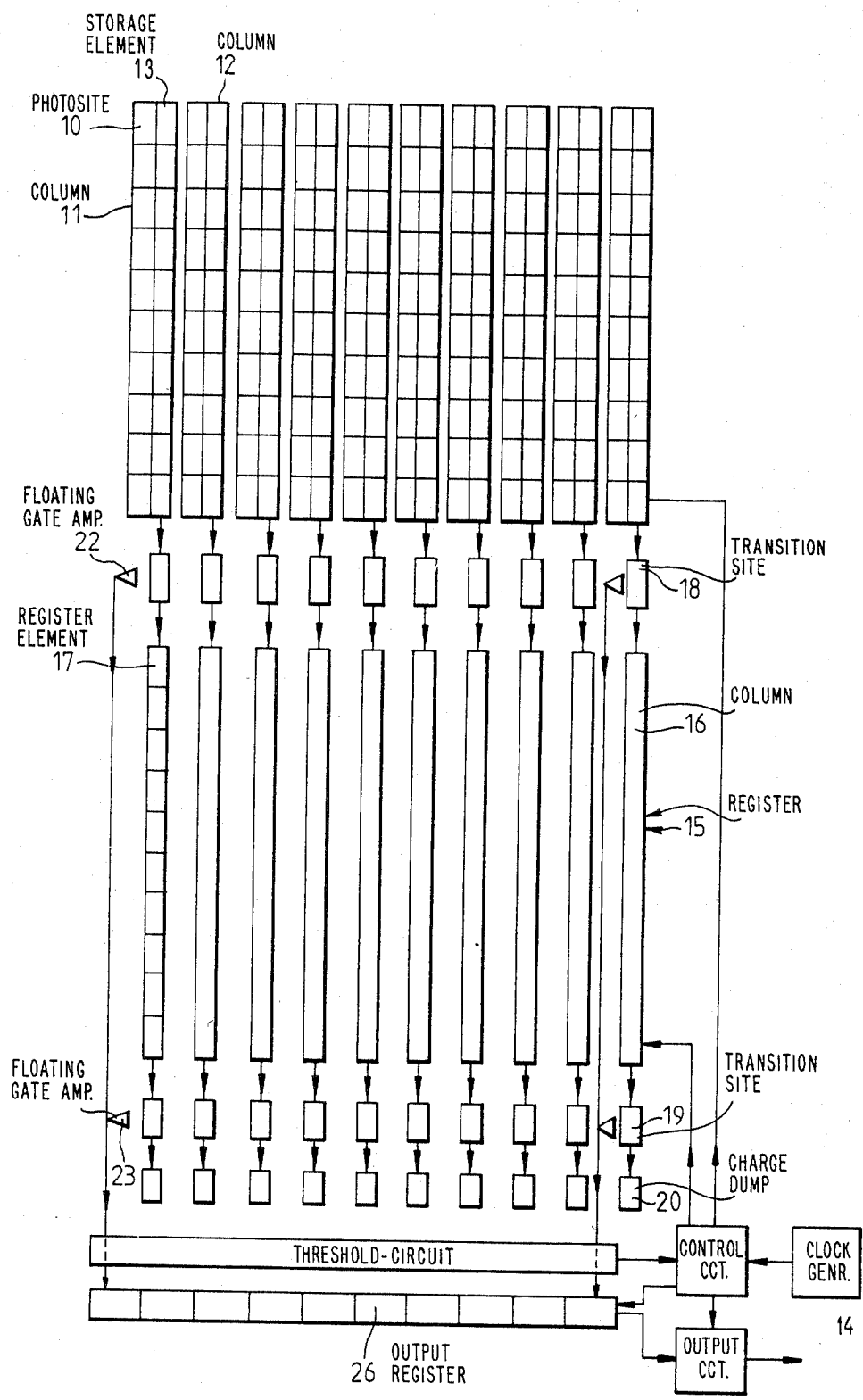

RADIATION DETECTING APPARATUS FOR DETECTING A BRIEF RADIATION SIGNAL

This invention relates to radiation detecting apparatus, and in particular to such apparatus for detecting a brief radiation signal in the presence of background radiation.

Many forms of radiation detecting apparatus exist, ranging from the simple photo-sensitive device to the very complex image-forming sensors. There is, however, a particular requirement for detecting brief radiation signals in the presence of a background. Additionally it is often necessary to be able to determine the direction or location of the source of the signal. Whilst the latter requirement may be satisfied in a rough sense by devices such as a quadrant detector, this does not give the accuracy and speed required in many instances. For example, for a laser warning receiver to be of use in a vehicle at which a laser is directed, it is necessary to determine accurately and immediately the direction from which the radiation came. This will enable the vehicle to respond accordingly. Clearly such applications apply mainly in military activities, though they might apply in other fields. The ability to determine the direction of a radiation source depends not only upon the optical system employed, but also upon the discriminating ability of the radiation-detecting apparatus itself, and it is with latter aspect that the invention is concerned.

Charge-coupled device (or CCD) imaging arrays are known which comprise an array of radiation-sensitive elements formed on a common substrate. Also formed on the same substrate is a further array of storage elements and an output register. Radiation of the appropriate wavelength received by any of the elements causes a charge to be accumulated, proportional to the radiation received. The charge stored in each element of the array is shifted through the array into the storage elements from where the contents of each element are processed. One example of such a device is the moving target indicator system described in U.S. Pat. No. 4.301,471. The device described is one in which each and every element is checked to see if there is any change in charge since the exposure of the previous frame. For an array of 32×32 elements this requires at least one clock pulse per element and in fact the embodiment described requires several clock pulses to shift the charge from each element into a register. The quantity of charged stored on a radiation-sensitive element is proportional to the time that the element is exposed to the radiation if the radiation is continuous. The charges produced by background radiation can thus be large, and possibly much larger than the charge from the brief radiation signal. The larger the background charges, the greater is the background "noise", or random frame-to-frame difference in charge accumulated on a single photosite. To minimise such noise the exposure time, which is also the frame time or time between successive dischargings of the photosites, should preferably be made comparable with the signal pulse duration; this will not generally be possible in pulsed laser applications, but at least the exposure time should be diminished down to a practical limit. In the U.S. Patent referred to above the necessity for a number of shift clock pulses per element of the array makes such a reduction in exposure time of each frame impossible, and makes the detection of very short pulses impossible.

It is an object of the invention to provide radiation-detecting apparatus for detecting a brief radiation signal in the presence of background radiation.

According to the present invention there is provided radiation-detecting apparatus for detecting a brief radiation signal in the presence of background radiation, which includes a plurality of radiation-sensitive devices arranged in a two-coordinate array and each operable to cause the storage of an electric charge proportional to the radiant energy incident upon it, a like plurality of storage elements each associated with a separate radiation-sensitive device, a transfer arrangement operable to transfer repetitively any stored charge to its associated storage element to store a radiation image frame, register means having a number of storage locations equal to the number of radiation-sensitive devices and arranged in a similar two-coordinate array, a shift arrangement operable to shift repetitively the radiation image frame stored in the storage elements into the register means in a series of parallel bit streams defined by one of said two coordinates and simultaneously to shift out of the register means the preceding radiation image frame, detector means operable to compare the contents of corresponding bit positions in each bit stream shifted into and out of the register means simultaneously, a sampling circuit responsive to an output from the detector means to sample the outputs of the detector means associated with each bit stream, and output means responsive to the sampled outputs to define the position in the radiation image frame of each bit position producing an output from the detector means.

The array of radiation-sensitive devices and the plurality of storage elements form a charge-coupled image sensor.

The invention will now be described with reference to the accompanying drawing which shows a block schematic diagram of one embodiment of the invention.

Referring now to FIG. 1, this shows a CCD array of radiation sensitive areas or photosites 10 arranged in 10 columns 11 each of 10 areas, and formed on a silicon substrate. Adjacent to each column 11 is a column 12 of 10 storage elements 13, linked by charge-flow channels to the photosite, and linked to each other to form register columns. Each storage element 13 is associated with a particular one of the sensitive areas 10. The radiation-sensitive areas and associated storage elements occupy the frame in which a radiation image may be formed by means of a suitable optical system. A cycle of clock pulses from a clock pulse generator 14 via a control circuit 25 transfers any stored charge from each sensitive area 10 to its associated storage element 13 when required, all transfers taking place simultaneously.

Also formed on the silicon substrate, but outside the radiation image frame, is a register 15 comprising 10 columns 16 each of 10 register elements 17. One end of each column 16 is connected to an associated column 12 of storage elements by way of a transition site 18. The other end of each column 16 is connected by way of a further transition site 19 to a dissipative charge dump 20. Transfer of charge from the storage elements 13 into the register elements 17 and thence to the dumps 20 is effected by successive cycles of clock pulses produced by the clcok pulse generator 14.

Associated with each of the transition sites 18 and 19 is a floating gate amplifier 22 and 23 respectively, the two amplifiers associated with each separate column of the register 15 being connected as a differential pair. The output of each pair of amplifiers is connected to a threshold detector 24 controlling a control circuit 25. The outputs from the pairs of amplifiers once recognized, and only if recognized, by the threshold detector 24 are sampled into separate bits of a 10 place output register 26. The contents of the output register 26 may be clocked out through an output circuit 27 under the control of the control circuit 25, which also applies the clock pulses to the apparatus. The clock generator 14 determines the rate of charge transfer within the apparatus.

The operation of the device will now be described. It will be seen that short exposure time is made possible by dismantling the frame in series-parallel fashion, with conditional read-out. It is assumed that an optical system is provided such that the direction of the source of radiation determines the radiation-sensitive element or elements on which the radiation falls. As a result of radiation falling on the photosites an electrical charge is built up on these sites, the quantity of charge depending upon the intensity and duration of the radiation.

At regular intervals, say every 10 μs, the control circuit 25 applies one cycle of clock pulses to the array to cause the charge stored on each element 10 to be transferred to the associated storage element 13, in known manner. The radiation-sensitive array is thus available to store further charge.

The contents of the storage elements 13 are now shifted by a stream of clock pulses through the storage element columns 12 into the columns of register elements 17, in parallel streams, by way of the sites 18. At the same time, the previous contents of the register element columns 16 are shifted out of the register through the sites 19 into the dumps 20. This shifting is controlled by the control circuit 25, and is carried out at such a rate that the storage elements 13 have been emptied before the next charge transfer from the sensitive elements 10.

At any instant the sites 18 and 19 contain corresponding radiation image elements from two successive image frames. The differential arrangement of the outputs from the amplifiers means that an output will be sufficient to operate the threshold detector 24 only when a signal is present in one frame and absent from the immediately preceding (or succeeding) frame. When the signal exceeds the threshold level the control circuit 25 causes the outputs of each differential pair of amplifiers to be sampled and stored in the output register 26, and the shifting of charge in the array and in the frame store 15 is stopped, by the control circuit 25.

The contents of the output register 26 are clocked out through the output circuit 27 which locates each bit containing a signal. The location of the radiation sensitive element which received the radiation is known from the number of rows read out from the start of the frame and from the number of bits read out from the register 26. This is determined by the output circuit 27 to which reference clock pulses are also applied by way of the control circuit 25. When the output register 26 is empty process of shifting charge from the storage elements 13 to the register elements 17 is restarted.

Whilst the shifting of charge from the storage elements 13 to the register elements 17 is halted, it will be appreciated that the photosites 10 have additional time in which to accumulate charge. This means that when the next frame is shifted out of the storage elements all of the illuminated photosites will have accumulated more charge than in the previous frame. The differential amplifiers would interpret these as signals. It is therefore necessary when shifting is resumed, to clear the next frame through the system without taking any charge levels into consideration.

The procedure described above is repeated continuously, and leads to the identification of the exact part of the radiation-sensitive array which reacts to a short pulse of radiation.

The clock pulse generator 14 and the control circuit 25 have not been described in detail. The description given above of their function is believed to be sufficient to enable such circuits to be readily produced.

What we claim is:

1. Radiation detecting apparatus for detecting a brief radiation signal in the presence of background radiation, which includes a plurality of radiation-sensitive devices arranged in a two-coordinate array and each operable to cause the storage of an elecrtric charge proportional to the radiant energy incident upon it, a like plurality of storage elements each associated with a separate radiation-sensitive device, a transfer arrangement operable to transfer repetitively any stored charge to its associated storage element to store a radiation image frame, register means having a number of storage locations equal to the number of radiation-sensitive devices and arranged in a similar two-coordinate array, a shift arrangement operable to shift repetitively the radiation image frame stored in the storage elements into the register means in a series of parallel bit streams defined by one of said two coordinates and simultaneously to shift out of the register means for preceding radiation image frame, detector means operable to compare the contents of corresponding bit positions in each bit stream shifted into and out of the register means simultaneously, so as to detect changes in the radiation incident upon the array and to deliver an output signal when such a change is detected, a sampling circuit responsive to the output of the detector means associated with each separate bit stream and comprising a threshold circuit operable to deliver a signal only when the output of the detector means applied thereto exceeds a threshold level and a control circuit actuated by an output from the threshold circuit to cause instantaneous samples to be taken of the outputs of the detector means associated with each bit stream, and output means responsive to the sampled outputs to define the position in the radiation image frame of each bit position producing an output from the detector means.

2. Apparatus as claimed in claim 1 in which the radiation sensitive devices and the associated storage elements are charge-coupled semiconductor devices formed adjacent to one another on a common substrate.

3. Apparatus as claimed in claim 2 in which the array of radiation-sensitive devices is a rectangular coordinate array in which the devices are formed in lines along one coordinate, the storage elements also being formed in lines separating adjacent lines of the devices.

4. Apparatus as claimed in claim 1 in which the register means comprise a plurality of charge-coupled devices formed on the same substrate as the radiation-sensitive devices and the storage elements.

5. Apparatus as claimed in claim 4 in which the transfer mechanism and the shift mechanism include a clock pulse generator operable to generate at least one clock pulse train for application to the register means, to the radiation-sensitive devices and to the storage elements.

6. Apparatus as claimed in claim 1 in which the detector means comprise, for each bit stream, a first amplifier responsive to the charge transferred into the register means and a second amplifier responsive to the charge transferred out of the register means, the outputs of the two amplifiers being connected so as to deliver to the sampling circuit only the difference between the individual outputs of the two amplifiers.

7. Apparatus as claimed in claim 1 in which the output means includes an output register and means for shifting the contents of the output register through an output detector operable to define the position in the radiation image frame of each bit position producing a detector output in excess of the threshold level.

8. Apparatus as claimed in claim 1 in which the control circuit is operable to stop the operation of the transfer arrangement and the shift arrangement whilst detector outputs are stored in the output register.

9. Apparatus as claimed in claim 8 in which the control circuit is operable to discard a radiation image frame exposed whilst the operation of the transfer arrangement and of the shift arrangement has been stopped.

* * * * *